J. M. DONOHUE.
MILK BOTTLE HOLDER.
APPLICATION FILED APR. 16, 1919.
1,335,369.
Patented Mar. 30, 1920.
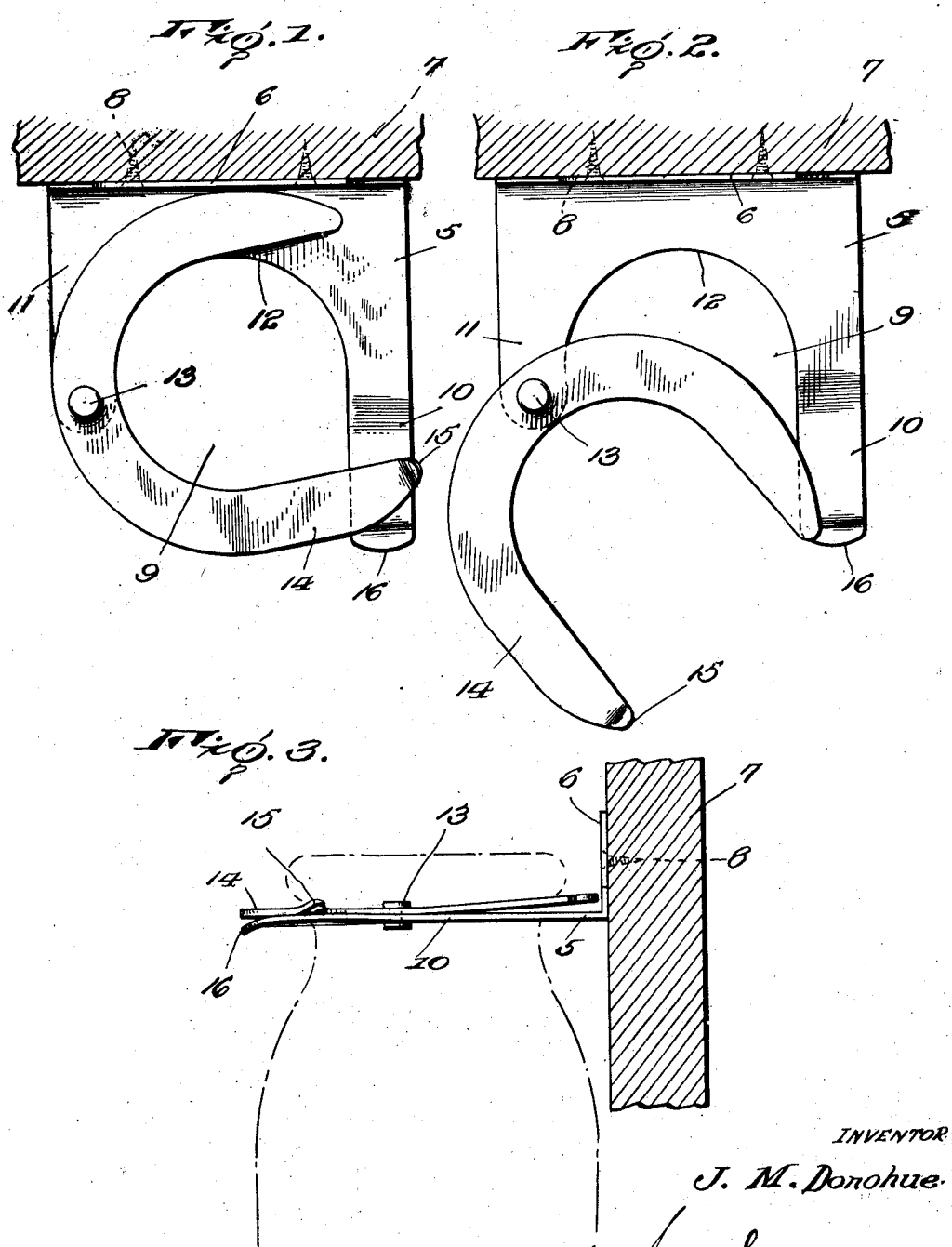
INVENTOR
J. M. Donohue.

UNITED STATES PATENT OFFICE.

JAMES M. DONOHUE, OF AMSTERDAM, NEW YORK.

MILK-BOTTLE HOLDER.

1,335,369.   Specification of Letters Patent.   Patented Mar. 30, 1920.

Application filed April 16, 1919. Serial No. 290,383.

*To all whom it may concern:*

Be it known that I, JAMES M. DONOHUE, a citizen of the United States, residing at Amsterdam, in the county of Montgomery and State of New York, have invented certain new and useful Improvements in Milk-Bottle Holders, of which the following is a specification.

This invention relates to holders for milk bottles and similar containers and has for its object the provision of a comparatively simple and inexpensive device of this character capable of being readily attached to a door jamb, post, or other support and from which a bottle of milk may be conveniently suspended out of reach of cats, dogs and other stray animals until removed by the housekeeper.

The invention comprises a holder or suspension device for milk bottles including a supporting member having a receiving recess formed therein for the reception of the neck of a bottle and a swinging carrying member or keeper movable to operative position across the mouth of the receiving recess for preventing accidental displacement of said bottle.

The invention further contemplates so constructing the carrying member or keeper that when moved in one direction the milk bottle will enter the receiving recess and when moved in the opposite direction the bottle will be withdrawn therefrom and yet supported by the carrier in a convenient position be taken in the hand of the operator. In other words, this movable member serves in one position as a keeper to close the mouth of the forked support, and it is held by friction in this position, and it serves when moved to the other position as a carrier supporting the bottle by its neck and moving it out of the forked support to a position where it can be readily taken in the hand and entirely withdrawn, because the bottle is now out of the support and the mouth of the carrier is now open.

A still further object is generally to improve this class of devices so as to increase their utility, durability and efficiency.

In the accompanying drawings:

Figure 1 is a top plan view of a milk bottle holder constructed in accordance with the present invention showing the carrying member or keeper in closed position;

Fig. 2 is a similar view showing the carrying member or keeper swung laterally on its pivot so as to permit ready removal of a milk bottle therefrom;

Fig. 3 is a side elevation of Fig. 1.

Corresponding and like parts are referred to in the following description and indicated in all the views of the drawings by the same reference characters.

The improved milk bottle holder forming the subject-matter of the present invention comprises an attaching member or plate 5 having one end thereof bent to produce an upstanding flange 6 for engagement with the adjacent face of a door jamb, post or other element 7, and to which it is rigidly secured by screws or similar fastening devices 8. The body of the plate 5 is preferably disposed at substantially right angles to the element 7 and constitutes a forked support. This is brought about by forming in the free edge thereof a recess 9 defining spaced arms 10 and 11 of different lengths as shown. The throat 12 of the fork is preferably curved to conform to the shape of the neck of a milk bottle so as to permit the bottle to be conveniently suspended out of reach of cats, dogs and other stray animals, pending removal of the bottle of milk from the holder by the housekeeper.

Wholly overlying the support and pivotally mounted at 13 upon the short arm 11 thereof is a carrying member or keeper 14. The carrying member or keeper 14 is preferably formed of a single sheet of flat metal of substantially U-form, one of the legs of the carrying member 14 being longer than the other and having its terminal deflected upwardly to form a finger piece 15. The free end of the long arm 10 of the forked support is deflected downwardly to form a curved lip 16 so as to permit the carrying member to be swung laterally on its pivotal axis without striking or wedging on the free end of said arm. The carrying member 14 may be pivotally mounted in any suitable manner, but it is preferred to employ a rivet for this purpose so that there will be sufficient friction between the members to prevent accidental swinging movement of said carrying member.

In operation the carrying member 14 is swung laterally on its pivot 13 to the position shown in Fig. 2 of the drawings, after which the milk bottle is inserted therein with the neck of the bottle just below the bead at its mouth fitting between the legs of the carrying member. The latter is then swung inwardly to the position shown in Figs. 1 and 3 of the drawings, carrying the bottle with it in which position the longer leg of the carrier will extend across and close the mouth of the fork 9, thereby retaining the milk bottle in position on the holder.

In order to remove the milk bottle it is merely necessary to grasp the finger piece 15 and swing the carrying member 14 outwardly to the position shown in Fig. 2 of the drawings, when the milk bottle will be withdrawn from the support and yet suspended by the carrier in a convenient position for ready removal by the housekeeper. The long arm 10 of the support is preferably slightly curved or deflected upwardly so as to cause it to frictionally engage the long leg of the carrying member 14 when the latter is swung to closed or operative position and thus assist in preventing accidental swinging movement of the carrying member with respect to the attaching member.

The holders may be made in different sizes and shapes and the metal of which said holders are constructed may be japanned, galvanized, nickeled or otherwise coated to protect the holders from the action of the elements. While the device is principally designed for supporting or suspending milk bottles, it will, of course, be understood that it may be used with equally good results for other purposes without departing from the spirit of the invention.

Having thus described the invention, what is claimed as new is:

A milk bottle holder comprising a plate having a flange for attachment to a support and coacting outstanding arms of different lengths spaced to receive the neck of a milk bottle, the free end of the long arm being bent downwardly to form a terminal lip and the upper surface of said long arm being deflected upwardly at the rear of the lip to produce a raised portion, and a flat U-shaped carrier having legs of different lengths spaced to receive said bottle neck, its bend being pivoted upon the short arm whereby the longer leg lies upon the raised portion of the longer arm when the shorter leg lies upon the plate, and the shorter leg moves from this position over the raised portion of the longer arm when the longer leg is moved outward to carry the bottle forward.

In testimony whereof I affix my signature.

JAMES M. DONOHUE. [L. S.]